Patented May 26, 1925.

1,539,798

UNITED STATES PATENT OFFICE.

LUDWIG BENDA, OF MAINKUR, NEAR FRANKFORT-ON-THE-MAIN, AND OTTO SIEVERS, OF FECHENHEIM, NEAR FRANKFORT-ON-THE-MAIN, GERMANY.

PROCESS OF MAKING BENZOXAZOLON ARSONIC ACIDS.

No Drawing.     Application filed July 7, 1924. Serial No. 724,655.

*To all whom it may concern:*

Be it known that we, LUDWIG BENDA, a citizen of the Swiss Confederation, residing at Mainkur, near Frankfort-on-the-Main, Germany, and OTTO SIEVERS, a citizen of the Free State Hesse, residing at Fechenheim, near Frankfort-on-the-Main, Germany, have invented a certain new and useful Process of Making Benzoxazolon Arsonic Acids, of which the following is a full description.

We have found, that the new arsonic acid described in the application Serial No. 707,304 of April 17th 1924

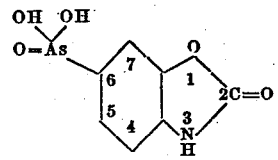

may also be obtained in an excellent yield by allowing nitric acid to act on benzoxazolon, reducing the nitro product to the amino compound and transforming the latter into the arsonic acid by diazotizing and treating with sodium arsenite. The reaction above described is represented by the following equation:

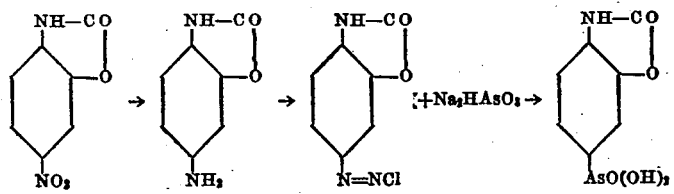

The fact that under all these manipulations the benzoxazolon ring should remain intact, and the arsonic acid would be obtained in this manner, could not be anticipated. Compared with the application cited above (action of phosgen on 4-amino-3-hydroxybenzene-1-arsonic acid) this process has the advantage that it is not necessary to begin with the 4-amino-3-hydroxy benzene-1-arsonic acid as starting material, the production of which is difficult, but with the easily accessible benzoxazolon. Homologues and substituted arsonic acids are obtained in the same manner from the corresponding benzoxazolons.

Example 1.

24.5 kilos 6-nitrobenzoxazolon (J. pr. (2); 42.441) are gradually stirred into a hot mixture of 36 kilos iron powder in 50 litres water and some acetic acid. The mixture should always show a feeble acetic acid reaction. If a test on filter paper does not show a yellow diffusion any longer, boiling is continued for about another 10 minutes, and the mixture then rendered alkaline by the addition of 80 litres sodium carbonate solution double normal. After siphoning off hot, the amino compound crystallizes from the cooled filtrate which must be protected as much as possible from the action of the air, in slightly reddish-colored prisms, which—after recrystallizing from alcohol— show a melting point of 198–201°. They dissolve in acetone ether, methyl alcohol, glacial acetic acid, as well as in alkalies, but only sparingly in benzene, naphtha, ligroine.

7.5 kilos of this 6-aminobenzoxazolon are dissolved in 50 litres water and 6.25 litres caustic soda solution (ten times normal), being then mixed with 6.5 litres of a solution of sodium nitrite (of which 130 c. c.= 1000 c. c. normal nitrite) and 70 kilos ice, and diazotized by the addition of 21.25 litres hydrochloric acid (ten times normal).

The diazo solution is run into a solution of 20 kilos caustic soda and 16 kilos sodium arsenite in 100 litres water heated to 45°. Soon begins a lively development of nitrogen and the solution is stirred until a resorcinol test does no longer indicate the presence of diazo compound.

The solution is then feebly methyl orange-acidulated with hydrochloric acid (27 litres concentrated hydrochloric acid 1.19) and filtered warm. Impurities remain on the filter; by the addition of 2 litres hydrochloric acid to the filtrate and by cooling down with ice the arsonic acid is separated in practically colorless crystals; it may be further purified through the sodium salt.

The product is identical with the compound described in application Serial No. 707,304.

Example 2

6-nitro-5-methylbenzoxazolon (obtained by the action of phosgen on 2-amino-4-methylphenol and by the action of nitric acid on the 5-methylbenzoxazolon thus produced) is reduced with iron powder and acetic acid.

18 kilos of the aminomethylbenzoxazolon thus obtained are dissolved in 100 litres water and 10 litres caustic soda solution ten times normal, mixed consecutively with 13 litres nitrite solution (130 c. c.=1000 c. c. normal nitrite), a solution of 20 kilos sodium arsenite in 30 litres water, 140 kilos ice, and finally diazotized by the gradual addition of 40 litres hydrochloric acid 10 times normal. 200 litres caustic soda solution double normal are allowed to flow gradually into the cold diazo solution, whereby the temperature gradually rises to 30°. After acidulating with concentrated hydrochloric acid and siphoning off—after allowing to stand for some time—the arsonic acid separates from the filtrate which has been well cooled down, in the form of a slightly reddish-brown powder. Purified through the sodium salt, the methylbenzoxazolon arsonic acid forms a white powder, easily soluble in alkalies and acetate, sparingly soluble in cold water, and insoluble in organic solvents. Its formula is:

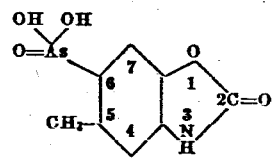

The 5-methylbenzoxazolon forms colorless needles of 130–131° melting point, easily soluble in alcohol and glacial acetic acid, sparingly soluble in benzene and hot water, and practically insoluble in cold water. With alkalies it forms a sodium salt of very good solubility.

The 6-nitro-5-methylbenzoxazolon crystallizes from glacial acetic acid in slightly yellowish-brown colored granules, practically insoluble in water and dissolving in alkalies with a pronounced yellow color. They dissolve also in alcohol and benzene, melting point 227–228°.

The 6-amino-5-methylbenzoxazolon forms colorless granules which easily assume a slightly violet coloration and which are readily soluble in alcohol, ether, acetone glacial acetic acid and alkalies, sparingly soluble in benzene and naphtha.

Example 3.

6-nitro-5-chlorobenzoxazolon (obtained by the action of phosgen on 2-amino-4-chlorophenol and of nitric acid on the 5-chlorobenzoxazolon thus produced) is reduced with iron and acetic acid.

185 kilos of the 6-amino-5-chlorobenzoxazolon thus obtained are diazotized with 300 kilos hydrochloric acid. (1.15), 1000 litres water, and 70 kilos nitrite. While stirring well the diazo solution is run into a solution of 320 kilos sodium arsenite and 500 kilos soda in 1000 litres water which is kept at the temperature of 45°. After acidulating with concentrated hydrochloric acid and siphoning off the chlorobenzoxazolon arsonic acid separates from the filtrate—on allowing the latter to stand and cooling off—in the form of white crystals, rather difficultly soluble in water, but easily soluble in dilute alkalies, sodium carbonate, and warm acetate solution. Its formula is:

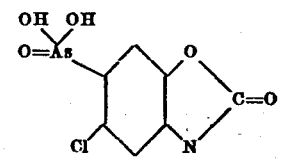

The 5-chlorobenzoxazolon forms colorless needles of 189–190° melting point. They dissolve sparingly in ether, benzene, ligroin, chloroform, easily in alcohol, acetone, acetic acid, but are insoluble in dilute mineral acids and easily soluble in dilute alkalies.

The 6-nitro-5-chlorobenzoxazolon forms fine, lustrous, slightly yellowish-colored leaves of 207° melting point. It dissolves easily in hot, but sparingly in cold alcohol. In acetone it dissolves easily, but sparingly in ether, benzene ligroine. The sodium salt forms beautiful yellow needles, sparingly soluble in cold, but easily in hot water.

The 6-amino-5-chlorobenzoxazolon forms colorless crystals, easily soluble in ether, alcohol, acetone, glacial acetic acid and dilute mineral acids, but difficultly so in cold water. The diazo compound when coupled with resorcinol yields an orange-red dyestuff.

Having now particularly described and ascertained the nature of our said invention and in what manner the same is to be performed, we declare, that what we claim is:

Process for the production of benzoxazolon-6-arsonic acids by reducing 6-nitrobenzoxazolons and transforming the amino compounds thus obtained into the arsonic acids by diazotizing and then treating with an arsenite.

In witness whereof we have hereunto signed our names this 19th day of June 1924.

LUDWIG BENDA.
OTTO SIEVERS.

Attest:
  JANE GUISTI,
  ERIKA JAYE.